United States Patent
Wirth et al.

(10) Patent No.: US 10,447,933 B2
(45) Date of Patent: Oct. 15, 2019

(54) CAMERA-BASED SIDE MIRROR FUNCTION OF A MOTOR VEHICLE

(71) Applicant: GM GLOBAL TECHNOLOGY OPERATIONS LLC, Detroit, MI (US)

(72) Inventors: Matthias Wirth, Ruesselsheim (DE); Martin Schaufler, Ruesselsheim (DE); Jong-Won Kim, Ruesselsheim (DE); Borris Ilse, Ruesselsheim (DE); Boris Jacob, Ruesselsheim (DE); Friedhelm Engler, Ruesselsheim (DE); Michael Richter, Ruesselsheim (DE); Tom Woods, Ruesselsheim (DE); Andrew Bradbury, Ruesselsheim (DE); Ralf Meyer, Ruesselsheim (DE); Frank Leopold, Ruesselsheim (DE); Thorsten Schurna, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 332 days.

(21) Appl. No.: 15/418,860

(22) Filed: Jan. 30, 2017

(65) Prior Publication Data

US 2017/0223274 A1 Aug. 3, 2017

(30) Foreign Application Priority Data

Jan. 28, 2016 (DE) .................... 20 2016 000 528 U

(51) Int. Cl.
*H04N 5/232* (2006.01)
*B60K 35/00* (2006.01)
(Continued)

(52) U.S. Cl.
CPC ........... *H04N 5/23293* (2013.01); *B60H 1/34* (2013.01); *B60K 35/00* (2013.01); *B60R 1/00* (2013.01);
(Continued)

(58) Field of Classification Search
CPC ................ B60R 11/04; B60R 11/0235; B60K 2350/106; B60K 2350/2013
(Continued)

(56) References Cited

U.S. PATENT DOCUMENTS 9,707,896 B2 * 7/2017 Boegel ...................... B60R 1/00
2009/0085368 A1 * 4/2009 Coffelt .................. B60K 35/00
296/70

(Continued)

FOREIGN PATENT DOCUMENTS

DE 10313325 A1 10/2004
DE 202004012723 U1 2/2005
(Continued)

OTHER PUBLICATIONS

German Patent Office, German Search Report for German Application No. 202016000528.7, dated Nov. 3, 2016.

*Primary Examiner* — Jason S Morrow
*Assistant Examiner* — E Turner Hicks
(74) *Attorney, Agent, or Firm* — Lorenz & Kopf, LLP

(57) ABSTRACT

A motor vehicle includes a motor vehicle body having an interior forming a passenger compartment. At least one camera is arranged on the outside of the motor vehicle body for imaging an area to the side and behind of the motor vehicle. In the interior of the motor vehicle, particularly in the region of an instrument panel, a monitor or display is arranged in or on an air outlet. The monitor is connected to the camera for continuously displaying the imaged area to occupants, and in particular a driver, in the passenger compartment.

12 Claims, 3 Drawing Sheets

(51) Int. Cl.
  *B60H 1/34* (2006.01)
  *B60R 11/02* (2006.01)
  *B60R 1/00* (2006.01)
  *B60R 11/04* (2006.01)
  *B62D 35/00* (2006.01)
  *H04N 7/18* (2006.01)
  *B60R 11/00* (2006.01)

(52) U.S. Cl.
  CPC .......... *B60R 11/0235* (2013.01); *B60R 11/04* (2013.01); *B62D 35/00* (2013.01); *H04N 7/183* (2013.01); *B60K 2370/152* (2019.05); *B60K 2370/21* (2019.05); *B60K 2370/797* (2019.05); *B60R 2011/004* (2013.01); *B60R 2300/20* (2013.01); *B60R 2300/8066* (2013.01); *B60Y 2400/92* (2013.01)

(58) Field of Classification Search
  USPC ............................... 296/37.12, 70, 1.08, 208
  See application file for complete search history.

(56) References Cited

U.S. PATENT DOCUMENTS

2016/0300516 A1* 10/2016 Ro .................. B60K 37/02
2017/0166036 A1*  6/2017 Krolewski ........... B60H 1/3421

FOREIGN PATENT DOCUMENTS

DE       102004039450 A1   3/2006
DE       102011102773 A1   6/2012

* cited by examiner

CAMERA-BASED SIDE MIRROR FUNCTION OF A MOTOR VEHICLE

CROSS-REFERENCE TO RELATED APPLICATION

This application claims priority to German Patent Application No. 202016000528.7, filed Jan. 28, 2016, which is incorporated herein by reference in its entirety.

TECHNICAL FIELD

The present disclosure pertains to a motor vehicle with a camera-based side mirror function.

BACKGROUND

For reducing the fuel consumption of vehicles it is generally desirable to keep the aerodynamic drag of the motor vehicle as low as possible. Side mirrors or rear-view mirrors, which are invariably arranged on an outside of the motor vehicle body and which project from an outer skin of the motor vehicle towards the outside, sometimes have a disadvantageous effect on the aerodynamic drag.

Accordingly, there is a need in the art to provide a motor vehicle with as low as possible an aerodynamic drag. Such a vehicle should be free of side or outside mirrors, while maintaining the functionality of a side mirror. Furthermore, the vehicle should be characterized by an interior design that is attractive both visually and aesthetically. In particular, there is a need to replace a side mirror which is particularly intuitive in handling and is widely accepted by users. The solution should also contribute to an interior design of the motor vehicle that is well structured and clearly arranged.

SUMMARY

In accordance with the present disclosure, a motor vehicle includes a motor vehicle body and with an interior forming a passenger compartment. On the outside of the motor vehicle body at least one camera is arranged. In the interior of the motor vehicle, in particular in the region of an instrument panel, an air outlet with a monitor is arranged. Here, the monitor is arranged in or on the air outlet. Furthermore, it is coupled or connected to the camera in terms of data. The image-recording camera is connected in particular to the monitor of the air outlet in an image-transmitting manner, or coupled therewith in terms of data. Accordingly, the image recorded by the camera can be continuously and in real time reproduced in the interior of the vehicle on the monitor of the air outlet.

Positioning the monitor on or in the air outlet is not only particularly space-saving. It is also highly suitable for substitution of a side mirror arranged outside on the motor vehicle. Accommodating the monitor on or in the housing of the air outlet is particularly intended and suitable for air outlets such as are arranged in the immediate vicinity of a conventional side mirror of the motor vehicle, for example in the region of an A-pillar or approximately at the height of a belt line of the motor vehicle. Such an arrangement of a monitor increases the user acceptance for a monitor acting as side mirror since the driver of such a motor vehicle hardly requires getting used to the "virtual mirror position".

When the driver wishes to look into a side mirror, he will invariably look intuitively at the right or left edge of an instrument panel or at the left or right A-pillars of the motor vehicle body. In the immediate proximity of the usual position of an outside mirror there is now located an air outlet arranged in the vehicle interior and adjoining the A-pillar, on the monitor of which a rearward-directed camera image is reproduced. In particular, the monitor can provide the image of a conventional rear-view mirror which can be recorded by the camera that is orientated towards the vehicle rear and arranged on an outside of the motor vehicle.

The camera is arranged in particular on an outside, for example on the left or right outside of the motor vehicle body. Combined with the monitor arranged in the air outlet, it can serve as a substitute for a rearward face mirror or side mirror function. Compared with a conventional side mirror that is arranged outside on the motor vehicle body, the camera can have a significantly lower aerodynamic drag and thus contribute towards a reduction of the aerodynamic drag of the entire motor vehicle.

According to a further development, the air outlet includes a housing with at least one side wall. Here, the side wall delimits a flow duct for supplied air. The flow duct is located in the interior of the housing and is formed by the housing or by the side wall of the housing. The air outlet furthermore includes a monitor that is arranged on or in the housing. The monitor is typically configured in the shape of a two-dimensional display. The monitor is at least suitable for two-dimensional image reproduction.

The integration and arrangement of the monitor in the or on the air outlet contributes, furthermore, to a particularly elegant, unusual and clearly arranged interior design of the motor vehicle.

The at least one side wall surrounds the flow duct typically in a circumferential direction perpendicularly to a longitudinal direction of the flow duct. By way of its geometry, the flow duct predetermines a flow direction for supplied air. The flow direction typically coincides with the longitudinal direction of the flow duct. The longitudinal direction in this case can also be called axial direction of the housing. The side wall can completely surround the flow duct in transverse direction, i.e. perpendicularly to the longitudinal direction and in this regard form a lateral housing or lateral edging for the flow duct.

For the housing of the air outlet, a wide range of geometries are possible in principle. The housing or the side wall forming the housing can for example have a round or oval but also a polygonal cross-sectional geometry. In that the side wall surrounds the flow duct in a transversal plane, the flow duct is quasi exclusively or predominantly formed by the side wall. In this regard, the side wall can also have a tubular basic geometry.

According to a further configuration, an outer edge of the monitor is located within a transversal boundary of the flow duct formed by the side wall. In the case of a circular cross-sectional geometry of the side wall or of the flow duct, the outer edge of the monitor is located radially offset to the inside with respect to the side wall. Thus, the monitor is located within the side wall and thus also within the flow duct subject to maintaining a gap. In axial direction or in longitudinal direction of the flow duct, the monitor can terminate for example flush with an end section of the side wall on the downstream side, thus with an outflow surface of the housing.

The monitor, in particular its image-reproducing front side, can also project axially from the downstream end of the side wall or be arranged upstream offset with respect to the downstream end of the side wall. In this case, the monitor, based on an outflow surface of the air outlet, can be arranged set back in the flow duct. The arrangement of the monitor in the flow duct makes possible accommodating the monitor in the motor vehicle interior in a particularly space-saving manner.

According to a further development, a flow gap is present between the outer edge of the monitor and an inside of the side wall. The flow gap is preferentially designed closed in circumferential direction. As such, the flow gap extends over the entire outer edge of the monitor, thus over the entire outer circumference of the monitor. Consequently, the air supplied to the air outlet can only flow into the vehicle interior only via the flow gap between the outer edge of the monitor and the inside of the side wall. Providing a flow gap which is continuous and uninterrupted at least in the region of the outflow surface suggests to the beholder a quasi-freely floating arrangement of the monitor within the flow duct or within the wall surrounding the flow duct. In the region of the outflow surface, the flow gap gives the air outlet a particularly elegant design.

According to a further configuration, the flow gap, seen in circumferential direction, has a substantially constant width between the monitor and the side wall. The width of the flow duct that is constant in circumferential direction likewise gives the air outlet a particularly elegant appearance and design which increases the attractiveness of the interior fittings of the motor vehicle. Furthermore, the outflow behavior of the air outlet can be particularly well and easily controlled and modified to suit requirements by the constant gap width.

According to a further configuration, at least one adjusting element is moveably mounted on the outer edge of the monitor or on the downstream end of the side wall. The adjusting element can be mounted on the housing or on the monitor for example longitudinally, in particular in a transversely shiftable or pivotable manner. The adjusting element functions as an air guide element or is mechanically coupled to a separate air guide element arranged upstream of the monitor. By the adjusting element, the outflow characteristic of the air outlet can be modified by the end user to suit requirements.

According to a further development, the adjusting element is designed as air guide element or is mechanically coupled to an air guide element. Furthermore, it is pivotably mounted on the housing or on the monitor with respect to an axis running in longitudinal direction of the flow duct. The pivotable mounting of the adjusting element makes possible a particularly simple and intuitive actuation of an air guide element in order to change the outflow characteristic of the air outlet, for example a spatial focusing or widening of the air flow, the entire air mass flow or the orientation of the air flow to suit requirements.

According to a further configuration of the air outlet, the monitor includes a mount with a basic body on a back side. The basic body is approximately arranged transversely in the middle in the flow duct. The basic body furthermore extends in longitudinal direction of the flow duct. It is mechanically connected to the housing axially spaced from the monitor. A basic body which is elongated in such a manner or extends in longitudinal direction of the flow duct makes possible forming a circumferential uninterrupted flow gap between the monitor and the side wall of the housing in the region of the outflow surface of the air outlet facing the beholder.

According to a further development, the basic body supports itself on the inside of the side wall with at least three webs running in transversal directions. In the case of a side wall designed round in cross section, the webs each radially extend in different directions to the outside. When a total of three webs are provided, these are each arranged outside on the basic body at 120° relative to one another in circumferential direction. When more than three webs are provided, an equidistant arrangement and orientation of the webs on the basic body is provided for an even load distribution.

The ends of the webs located radially outside can each be provided with a foot that is configured complementarily to the inside of the side wall. The webs can be arranged on the inside of the side wall in a clamping manner. However, form-fit connections of the webs and of the side wall are also conceivable.

Providing the monitor on a mount with a basic body proves to be particularly advantageous in terms of assembly. In first process steps, the monitor and the mount and separately thereof, the side wall or the flow duct, can be provided. The monitor can form an insert together with the mount which as a whole can be inserted into the housing of the air outlet and connected to the same.

According to a further development, the at least three webs are arranged upstream and offset with respect to the monitor on the or on the basic body. That axially offset arrangement of the webs relative to the monitor makes possible an appearance of a quasi-freely floating arrangement of the monitor in the region of the outflow surface of the air outlet.

According to a further configuration, the monitor is designed as a liquid crystal display, thus as an LCD display. The monitor can include a two-dimensional regular arrangement of individual pixels which, electronically activated, are suitable and configured for generating an image, in particular a camera image. The monitor can have a resolution of several hundred pixels in the two different directions of the monitor plane. In this regard, a camera image can be reproduced in high resolution in the interior of the motor vehicle by the monitor.

According to a further configuration, the camera is inserted into a side door of the motor vehicle body, in particular into a trim molding of a motor vehicle side door. Furthermore, the camera is orientated against a travelling direction of the motor vehicle. Here it is provided in particular that the side door of the motor vehicle has a waist, i.e. a curvature that is concavely directed to the inside and that the camera is arranged in the region of that curvature in such a manner that, largely completely embedded in the side door or its trim molding, it can visually record a region located laterally of and behind the vehicle.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
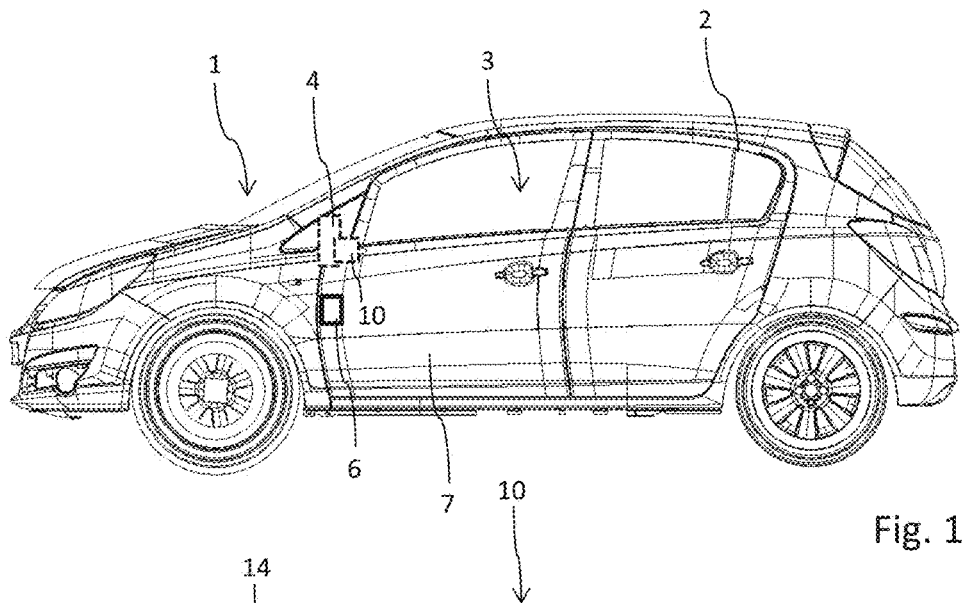
FIG. 1 is a schematic lateral view of a motor vehicle.

The motor vehicle 1 shown in schematic lateral view in FIG. 1 is configured as passenger car. It includes a self-supporting motor vehicle body 2 and an interior 3 functioning as passenger compartment or cell. In the interior 3, in particular in the region of an instrument panel 4 which is schematically indicated in FIG. 1, at least one air outlet 10 according to FIG. 2 is arranged.

As indicated, furthermore, in FIG. 1, a camera 6, which is orientated against the forward or travelling direction F of the motor vehicle 1 outside on a side vehicle door 7, is located. In terms of data and imaging, the camera 6 is coupled to a monitor 30 arranged in the interior 3. The combination of camera 6 and monitor 30 can completely supersede a conventional lateral rear-view mirror function or outside mirror function of the motor vehicle and can function as a digital outside mirror.

Because of its small size and its embedding in the vehicle door 7, for example in a trim molding of the vehicle door, the camera 6 can be aerodynamically arranged particularly favorably outside on the motor vehicle. The aerodynamic drag of the motor vehicle 1 and also the fuel consumption of the motor vehicle can thus be reduced. Finally, the motor vehicle 1 can be designed without outside mirror or free of outside mirrors.

Figure 2:
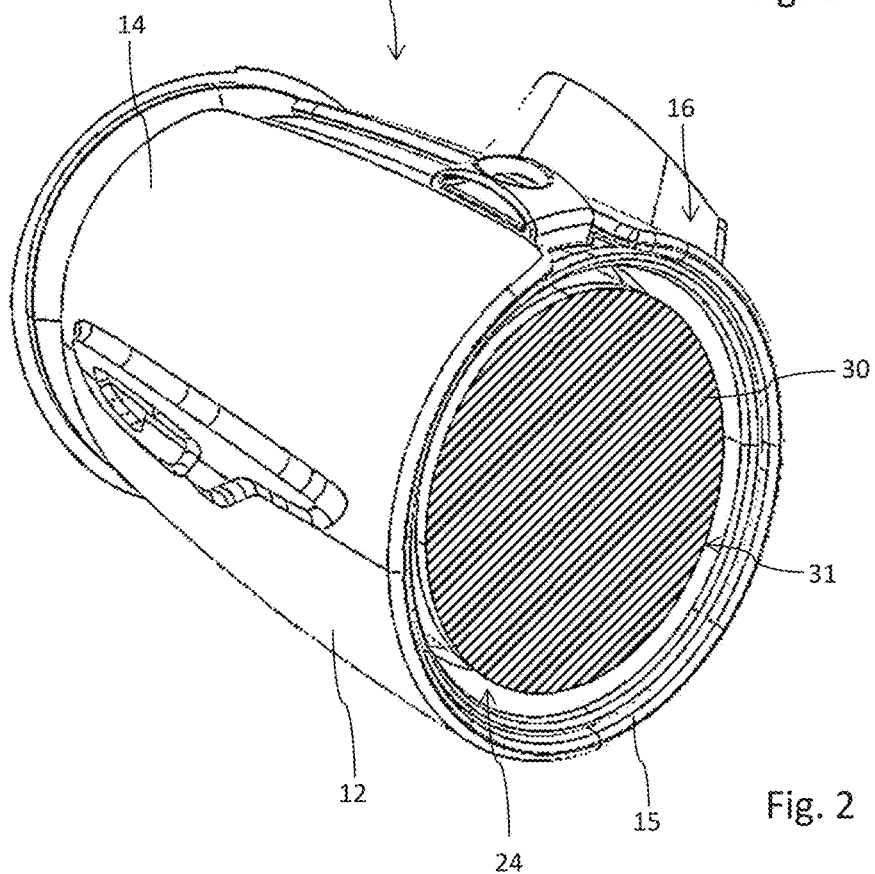
FIG. 2 is a perspective isolated representation of the air outlet arranged in the interior of the motor vehicle.
Figure 3:
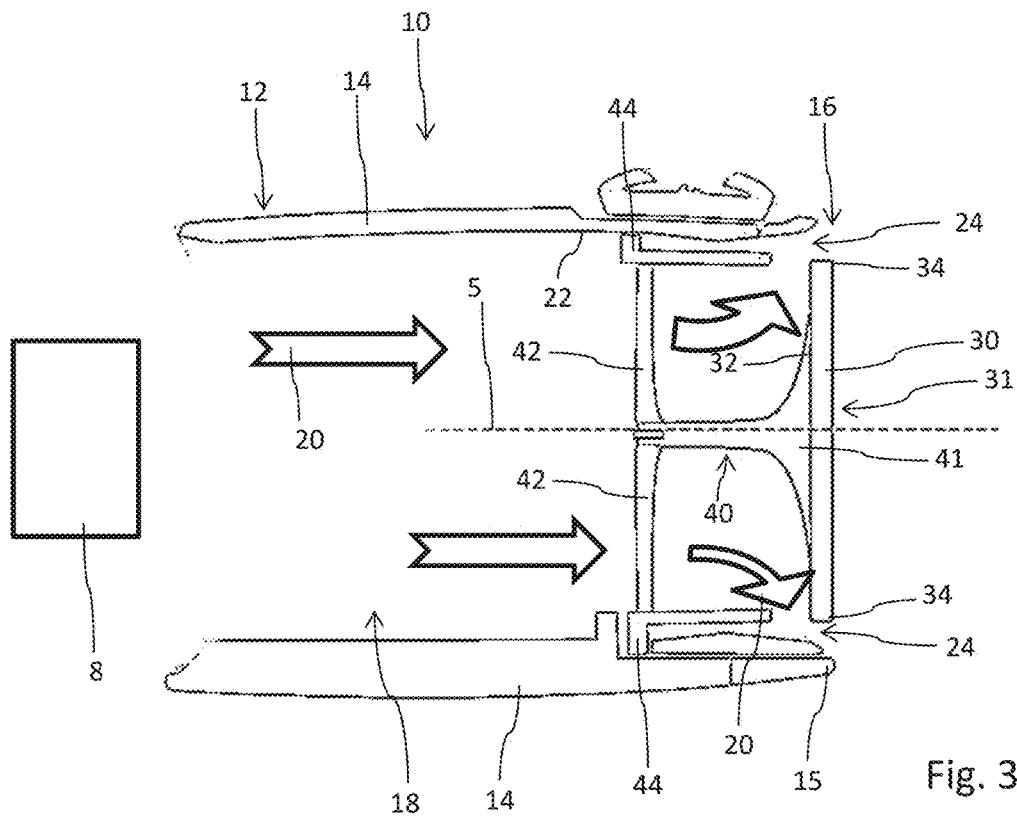
FIG. 3 is a cross section through the air outlet according to FIG. 2 in longitudinal direction.

The air outlet 10 shown isolated and in perspective view in FIG. 2 includes a housing 12 with a side wall 14. The housing 12 in this case is designed tubular. In the present exemplary embodiment, it has an approximately circular cross section. In this regard, merely one cylindrical side wall 14 is provided. Other embodiments of the housing 12 can include an oval or polygonal, for example rectangular cross section. Typically, the housing 12 is produced from an injection molded plastic part. The air outlet 10 or its housing 12 can be embedded flush into the instrument panel 4 flush with the surface so that for example an outflow surface 16 of the housing 12, which is formed on an end section 15 of the side wall 14 located downstream, terminates approximately flush with an interior trim or with the instrument panel 4. However, other embodiments are also conceivable in which the air outlet 10 with its housing 12 is arranged outside an instrument panel, so that an outside of the housing 12 is also visible to the end user.

On or in the housing 12, a monitor 30 which is schematically shown in FIG. 2 is arranged. The monitor 30 has a planar front side 31. The front side 31 of the monitor 30 can be configured, furthermore, as a liquid crystal display or LCD. In particular, the monitor 30 serves for reproducing a two-dimensional camera image.

In the embodiment shown here, front side 31 of the monitor 30 lies approximately in the outflow surface 16, which is formed by the end section 15 of the side wall on the downstream side. The monitor 30 is thus integrated flush with the outflow surface 16 of the air outlet 10. Based on the longitudinal direction of the flow duct 18, which is formed by the side wall 14 or transversely delimited by the side wall 14, it can also be set back from the outflow surface 16 or project from the outflow surface 16 in longitudinal direction or axial direction.

Here, a surrounding outer edge 34 of the monitor 30 is arranged spaced from an inside 22 of the side wall 14. In this regard, a surrounding and closed flow gap 24 is located between the monitor 30 and the side wall 14. The flow gap 24 in this case is annular in shape. By way of the flow gap, an airflow 20 supplied to the air outlet 10 for example via a blower 8 can be directed past the monitor 30 into the interior 3 of the vehicle 1.

In terms of assembly, the monitor 30 is provided with a back side 32 with a mount 40 facing away from the front side 31. The mount 40 includes a basic body 41 which tapers against the flow direction of the airflow 20 and which is arranged transversely in the middle in the flow duct 18 of the housing 12. The basic body 41 runs against the direction of the airflow 20 starting out from the back side 32 of the monitor 30 in a conical or concavely tapering manner. An axial distance from the back side 32 of the monitor 30, the basic body 41 includes three webs 42 which radially project to the outside, as are most clearly shown in FIG. 4. The individual webs are arranged equidistantly in circumferential direction, approximately at an angular distance of 120° relative to one another. The webs 42 are arranged on the basic body 41 axially offset with respect to the monitor 30. That axial offset makes possible forming a circumferential uninterrupted flow gap 24 between the outer edge 34 of the monitor 30 and of the inside 22 of the side wall 14 of the housing 12. For the sake of a simple and intuitive representation, only the outer edge 34 of the monitor 30 is shown in FIG. 4.

Viewing FIG. 2 it appears as if the monitor 30 floats freely in the middle of the housing 12. This should be considered advantageous not only under the aspect of design. On the contrary, the monitor 30 through its central arrangement in the housing 12 can conceal any mechanical components for the air control or air deflection.

On the ends located radially outside, the individual webs 42 include a foot 44 adapted to the contour of the side wall 14 in each case. By the feet 44, the mount 40 can be fixed on an inside 22 of the housing 12 on the side wall 14 in a clamping or form-fit manner.

Figure 4:
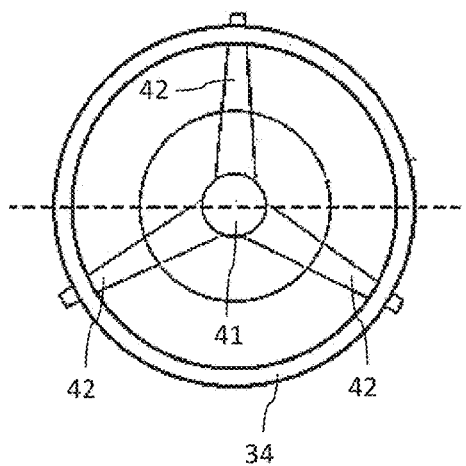
FIG. 4 is an isolated representation of the mount with the monitor according to FIG. 3.
Figure 5:
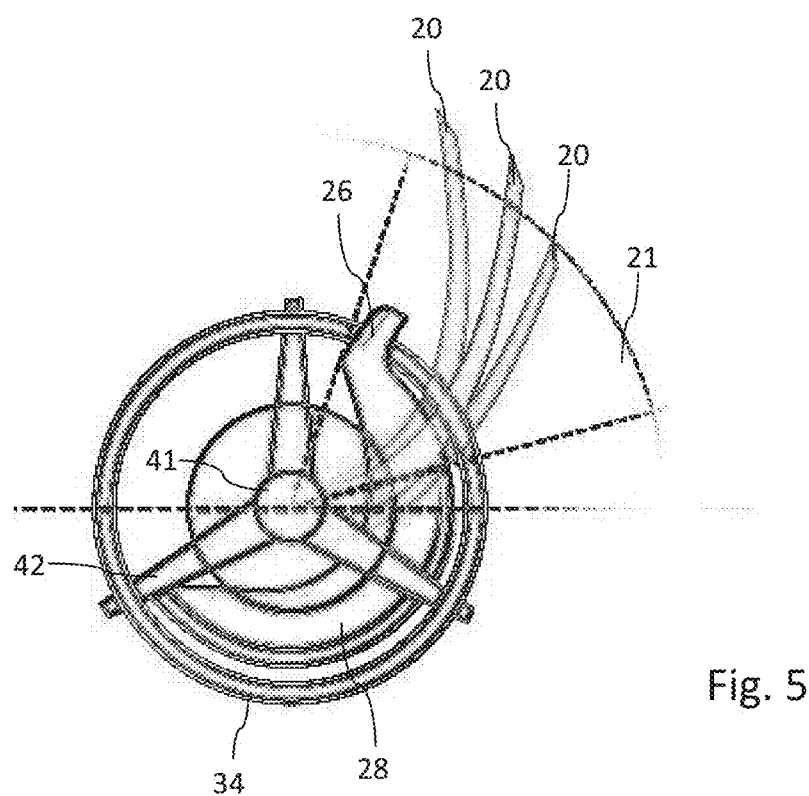
FIG. 5 is a further isolated representation of the mount, however with an adjusting element.

Complementarily to the representation according to FIG. 4, FIG. 5 additionally shows an adjusting element 26 which projects through the flow gap 24 and which is actuatable from the outside in a pivotable or shiftable manner. Additionally connected to the adjusting element 26 is an air guide element 28, which is located in the flow duct 18 and which in the manner of a fin is pivotably or shiftably moveably mounted within the flow duct 18. The air guide element 28, thus the adjusting element 26, is pivotably mounted in the present exemplary embodiment about an axis 5 which runs in longitudinal direction of the flow duct. By way of a pivot movement of the adjusting element 26, the air flow 20 is preferentially continuously adjustable within a preset space angle 21.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A side view system for a motor vehicle body having an interior and an exterior comprising:

a camera arranged on the exterior of the motor vehicle body for generating an imaged area adjacent the motor vehicle body;

an air outlet arranged in the interior of the motor vehicle body, the air outlet comprises a housing with at least one side wall configured to delimit a flow duct for supplied air;

a monitor supported on the air outlet and connected to the camera for continuously displaying the imaged area thereon while the system is active; and a mount configured on a back side of the monitor and the mount includes a basic body arranged approximately transversely in the center in the flow duct;

wherein the monitor is arranged on the housing and the basic body supports itself on the inside of the side wall with a plurality of webs extending transversely in the housing.

2. A side view system for a motor vehicle body having an interior and an exterior comprising:

a camera arranged on the exterior of the motor vehicle body for generating an imaged area adjacent the motor vehicle body;

an air outlet arranged in the interior of the motor vehicle body, the air outlet comprises a housing with at least one side wall configured to delimit a flow duct for supplied air;

a monitor supported on the air outlet and connected to the camera for continuously displaying the imaged area thereon while the system is active; and a mount configured on a back side of the monitor and the mount includes a basic body arranged approximately transversely in the center in the flow duct;

wherein the monitor is arranged on the housing and a plurality of webs are arranged upstream on the basic body offset with respect to the monitor.

3. The side view system according to claim 1, wherein an outer edge of the monitor lies within a circumferential boundary of the flow duct formed by the side wall.

4. The side view system according to claim 3, further comprising a circumferential flow gap formed between the outer edge of the monitor and an inside of the side wall.

5. The side view system according to claim 4, wherein the circumferential flow gap has a substantially constant width between the monitor and the side wall.

6. The side view system according to claim 3, further comprising at least one adjusting element is moveably mounted on one of the outer edge of the monitor or a downstream end of the side wall.

7. The side view system according to claim 6, wherein the adjusting element is configured as an air guide element.

8. The side view system according to claim 6, wherein the adjusting element is mechanically connected to an air guide element pivotably mounted with respect to an axis running in longitudinal direction of the flow duct.

9. The side view system according to claim 1, wherein the monitor comprises a liquid crystal display.

10. A motor vehicle comprising:

a motor vehicle body having an exterior and an interior;

a camera arranged on the exterior of the motor vehicle body and orientated against a forward travelling direction of the motor vehicle for generating an imaged area adjacent the motor vehicle body;

an air outlet arranged in the interior of the motor vehicle body, the air outlet comprises a housing with at least one side wall configured to delimit a flow duct for supplied air;

a monitor supported on the air outlet and connected to the camera for continuously displaying the imaged area thereon while the system is active; and a mount configured on a back side of the monitor and the mount includes a basic body arranged approximately transversely in the center in the flow duct, wherein the monitor is arranged on the housing and the basic body supports itself on the inside of the side wall with a plurality of webs extending transversely in the housing.

11. The motor vehicle according to claim 10, further comprising a vehicle door, wherein the camera is embedded on the exterior in the vehicle door.

12. The motor vehicle according to claim 11, wherein the vehicle door comprises a trim molding arranged thereon and the camera is embedded into the trim molding.

* * * * *